United States Patent [19]

Puryaev

[11] Patent Number: 4,468,122
[45] Date of Patent: Aug. 28, 1984

[54] INTERFEROMETER FOR CHECKING THE SHAPE OF CONVEX SURFACES OF OPTICAL COMPONENTS

[75] Inventor: Daniil T. Puryaev, Moscow, U.S.S.R.

[73] Assignee: Vysshee Voennoe Tekhnicheskoe Uchilische Imeni N.E. Baumana, Moscow, U.S.S.R.

[21] Appl. No.: 299,027

[22] PCT Filed: Jan. 30, 1980

[86] PCT No.: PCT/SU80/00012
§ 371 Date: Sep. 1, 1981
§ 102(e) Date: Sep. 1, 1981

[87] PCT Pub. No.: WO81/02199
PCT Pub. Date: Aug. 6, 1981

[51] Int. Cl.³ ............................................. G01B 9/02
[52] U.S. Cl. .................................................... 356/360
[58] Field of Search ......................... 356/352, 359, 360

[56] References Cited

U.S. PATENT DOCUMENTS 3,028,282  4/1962  Bernhardt et al. .................. 356/359
4,022,532  5/1977  Montagnino .

FOREIGN PATENT DOCUMENTS 9057    3/1971  Japan .................................... 356/359
1313844 4/1973  United Kingdom .
373519  7/1973  U.S.S.R. .............................. 356/359

OTHER PUBLICATIONS

Russian-Language Publication having Translated Title "Interferometers for Non-Contact Testing of Surfaces of Medium Diameters, with Translation.
Russian-Language Publication Having Translated Title "Block Diagram of a General-Purpose Interferometer for Testing the Quality of Optical Surfaces and Lenses, with Translation.
"Interferometers" by Yu. V. Kolomiytsov, L., Mashinostroenie Publ., 1976, p. 296.
"Studies and Check-Up of Optical Systems" by G. V. Kreopalova and D. T. Puryaev, Mashinostroenie Publ. 1978, pp. 210-213.

Primary Examiner—William L. Sikes
Assistant Examiner—Matthew W. Koren
Attorney, Agent, or Firm—Fleit, Jacobson, Cohn & Price

[57] ABSTRACT

An interferometer for checking the shape of convex surfaces of optical components comprises a monochromatic light source and a sequence of devices arranged therebehind in the path of beams including a focusing lens, a light splitter, a compensator, a lens system having as its last surface a reference concave surface having a center of curvature optically matched with the back focus of the focusing lens by means of the compensator. Arranged in the path of beams behind the lens system are an additional compensator, an additional light splitter, an additional focusing lens, a system of mirrors for directing the beams from the monochromatic light source to the additional focusing lens having its back focus matched by means of the additional compensator with the center of curvature of the reference concave surface of the lens system closest to the monochromatic light source, the radius of curvature of this surface being other than that of the reference concave surface. The interferometer also comprises systems for recording interference patterns obtained upon reflection of beams from the reference surfaces of the lens system.

The interferometer is designed preferably for checking the shape of convex surfaces of optical components of large diameters (about 600 mm) such as of lenses of wide-aperture, long-focus photographic objectives.

4 Claims, 4 Drawing Figures

INTERFEROMETER FOR CHECKING THE SHAPE OF CONVEX SURFACES OF OPTICAL COMPONENTS

TECHNICAL FIELD

The invention relates to devices for checking optical components and more particularly, to inteferometers for checking the shape of spherical surfaces of optical components.

BACKGROUND OF THE INVENTION

Known in the art are interferometers for checking the shape of convex spherical surfaces of lenses based on the employment of test glasses and compensators (zero-correctors) (cf. Saunders I. B., I. Res. Nat. Bur. Stand., 1954,53, No. 1, p. 29). Test glasses do not make it possible to check the surface in a single pass since the diameter of the test glass is substantially smaller than the diameter of the surface being checked, and a repeated aplication of the test glass to the checked surface takes much time. In addition, the contact of the test glass with the checked surface requires a careful preparation of the surface for the checking procedure. In case the surface radius is changed in view of the manufacturing considerations, a new test glass should be made which raises the cost of the check procedure.

Known in the art are interferometers using compensators which transform a planar or spherical wavefront into a wavefront of a desired configuration. (cf. G. V. Kreopalova, D. T. Puryaev, Studies and Check-up of Optical Systems, M., Mashinostroenie Publ., 1978).

In such interferometers the problem of checking resides in obtaining information on errors of the surface being checked simultaneously in all zones thereof, rather than in individual areas. This problem is solved by using a compenstor which is so designed as to direct light rays in the form of a homocentric beam having its vertex coinciding with the center of the convex spherical surface being checked. In case the latter is on the lens, the compensator should be designed to take into account the action of the other surface of the lens so as to check the convex surface in the same manner as a concave surface which is checked from the center of curvature. This operation requires the use of a plurality of individual compensators since each compensator can only be used for checking a lens of a predetermined configuration.

In applications where the surface being checked is the surface of an optical component made of an opaque material, the interferometer based on the use of a compensator cannot be used at all for checking convex surfaces by means of beams directed into the interior of the material of an optical component.

Known in the art is an inteferometer designed for checking the shape of convex spherical surfaces of optical components, comprising a monochromatic light source and a sequence of devices therebehind in the path of beams including a focusing lens, a light splitter, a compensator, a lens system having its downstream surface which comprises a reference concave spherical surface having a center of curvature which is optically matched with the back focus of the focusing lens and a system for recording the interference pattern (cf. Yu. V. Kolomiytsov, Interferometers, L., Mashinostroenie Publ., 1976, p. 204–211.)

This interferometer makes it possible to check spherical surfaces of optical components of comparatively small diameters (smaller than 100–150 mm) and with a certain ratio D/R, wherein D is the diameter and R is the radius of the surface being checked.

The employment of the prior art interferometer is hampered in checking convex spherical surfaces of greater diameters (of the order of 500–600 mm) and with other ratios of D/R since it requires the replacement of the lens system with the reference surface and lens consuming adjustment operations, and the size of the interferometer of the prior art type is unnecessarily large.

SUMMARY OF THE INVENTION

The invention is based on the problem of providing an interferometer for checking the shape of convex surfaces of optical components which makes it possible to perform a high-grade check of surfaces of both large (about 600 mm) and small (about 100 mm) diameter with various ratios D/R without the need for labor consuming adjustment operations and which is comparatively small in size.

This problem is solved by an interferometer for checking the shape of convex surfaces of optical components, comprising a monochromatic light source and a sequence of devices arranged therebehind in the light path including a focusing lens, a light splitter, a compensator, a lens system having its last surface which comprises a reference concave spherical surface with a center of curvature optically matched by means of the compensator with the back focus of the focusing lens, and a system for recording the interference pattern obtained upon reflection of beams from the reference surface. According to the invention, the interferometer comprises a sequence of devices arranged in the path of beams behind the lens system, including an additional compensator, an additional light splitter, an additional focusing lens, a system of mirrors for directing beams from the monochromatic light source to the additional focusing lens having its back focus optically matched by means of the additional compensator with the center of curvature of the lens system which is the first in the beam path from the monochromatic source which also has a reference concave spherical surface having a radius of curvature other than that of the last reference surface, and an additional system for recording the interference pattern obtained upon reflection of beams from the first reference surface of the lense system.

In such an interferometer, the lens system preferably comprises two positive meniscus lenses and two plano-convex lenses arranged therebetween having their plane surfaces facing toward the convex surfaces of the meniscus lenses.

For checking-up convex spherical surfaces with small ratios of R/D, the lens system preferably comprises two positive meniscus lenses and a biconvex lens arranged therebetween.

For checking convex spherical surfaces with large ratios of D/R, the lens system may comprise two positive meniscus lenses in which the convex surface of at least one lens is an aspherical surface and functions as the main and additional compensators.

The interferometer according to the invention makes it possible to check convex spherical surfaces of optical components of large diameters in two ranges of maximum values of D/R without the need of making changes in the interferometer design, additional adjustment of its assemblies, or replacement of parts in checking components with different values of D/R.

All parts of the interferometer are stationary and form compact optical assemblies which can be conveniently arranged on an optical bench and may be formed as independent units for transportation.

In the interferometer according to the invention, a change from one range of values of D/R of the surfaces being checked to another is effected by merely rearranging the system of mirrors for directing beams to the additional lens, and no additional adjustment of the interferometer is required.

Simultaneous employment in the optical system of the interferometer of two reference concave spherical surfaces with different ratios of D/R is more economical than the use of two interferometers having the same reference surfaces or one prior art interferometer using change lenses having the same reference surfaces.

BRIEF DESCRIPTION OF THE DRAWINGS

The invention will now be described with reference to specific embodiments thereof illustrated in the accompanying drawings, in which.

BEST MODE FOR CARRYING OUT THE INVENTION

Figure 1:
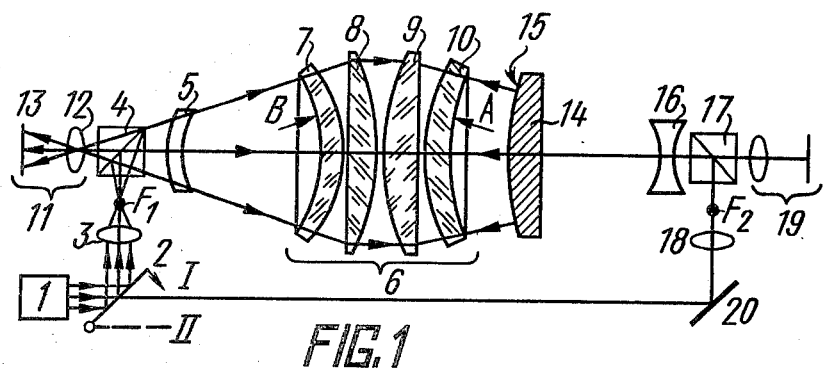
FIG. 1 shows an optical diagram of an interferometer and the path of beams in checking convex surfaces for one range of ratios of D/R.

An interferometer according to the invention comprises a monochromatic light source 1 (FIG. 1) such as a helium-neon laser, a rotatable plane mirror 2 which may take positions I and II, a focusing lens 3 which may comprise a microobjective with a telecentric beam path. The focusing lens 3 receives beams from the light source 1 reflected by the mirror 2 and forms a point light source which is located at the back focus $F_1$ of the lens 3.

A light splitter 4 is located behind the lens 3 in the light path and comprises, e.g. a cube with a translucent face deviating the beams to a compensator 5 comprising a single lens or a group of lenses.

The optical axis of the compensator 5 is matched with the optical axis of the lens 3 by means of the light splitter 4. Arranged behind the compensator 5 in the optical axis thereof is a lens system 6 consisting of lenses 7, 8, 9 and 10. The last surface A of the lens system 6 is a reference concave spherical surface having its center of curvature optically matched with the back focus $F_1$ of the lens 3 by means of the compensator 5. The first surface B of the lens system 6 is also a reference concave spherical surface, but its radius of curvature substantially differs from the radius of curvature of the surface A.

For recording the interference pattern obtained during the checking procedure upon reflection of beams from the surface A, there is provided a recording system 11 arranged on the optical axis of the lens system 6 and compensator 5 behind the light splitter 4. The recording system may comprise a photographic lens 12 and a light-sensitive layer 13 as shown in FIG. 1.

An optical component 14 being checked is arranged behind the lens system 6 in the path of the beams as shown in FIG. 1, and the surface 15 of the component being checked is arranged in such a manner that its center of curvature coincides with the center of curvature of the reference surface A.

An additional compensator 16 and an additional light splitter 17 matching the optical axis of the compensator 16 with the axis of an additional focusing lens 18 are arranged behind the lens system 6 on the optical axis thereof. The back focus $F_2$ of the lens 18 is matched by means of the compensator 16 with the center of curvature of the reference concave spherical surface B of the lens system 6.

An additional system 19 for recording the interference pattern obtained during checking upon the reflection of beams from the reference concave spherical surface B is arranged behind the light splitter 17 on the optical axis of the lens system 6.

In addition, for directing beams to the lens 18, there is provided a stationary plane mirror 20 (or a group of mirrors) which, in combination with the rotatable mirror 2, forms a system of mirrors for directing beams from the light source 1 to the additional focusing lens 18.

Figure 2:
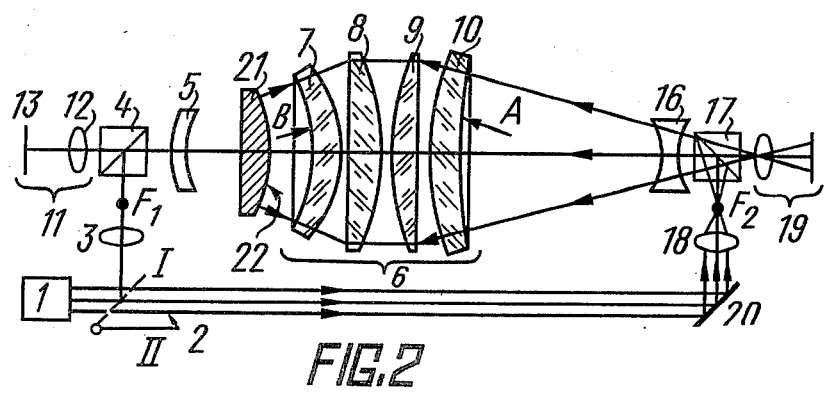
FIG. 2 shows the same diagram as that shown in FIG. 1 and the path of beams in checking convex surfaces for a different ratio of ratios of D/R.

FIG. 2 shows an optical diagram of the same interferometer as in FIG. 1 with the only difference that an optical component 21 is arranged between the compensator 5 and the lens system 6, and the surface 22 of the component 21 being checked is positioned in such a manner that the center of curvature of the surface 22 coincides with the center of curvature of the surface B.

FIGS. 1 and 2 show the lens system 6 consisting of two positive meniscus lenses 8 and 9. The convex surfaces of the lenses 7 and 10 face toward the plane surfaces of the lenses 8 and 9.

Figure 3:
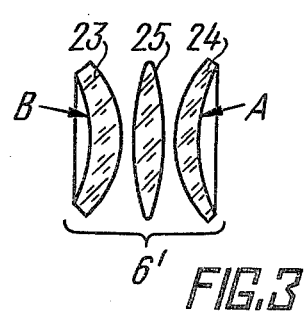
FIG. 3 is an embodiment of the lens system adapted for checking convex spherical surfaces with small ratios of D/R.

FIG. 3 shows an embodiment of the lens system 6' which consists of two positive meniscus lenses 23 and 24 and a biconvex lens 25 arranged therebetween. The concave surfaces A and B of the lenses 24 and 23, respectively, are reference spherical surfaces.

Figure 4:
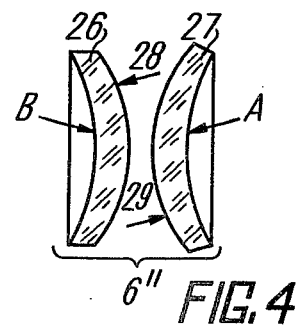
FIG. 4 is an embodiment of the lens system convenient for checking-up convex spherical surfaces with greater ratios D/R.

FIG. 4 shows an embodiment of the lens system 6" consisting of two positive meniscus lenses 26 and 27 having reference concave spherical surfaces B and A, respectively. At least one of the convex spherical surfaces 28 and 29 - 28 in this embodiment, is aspherical and, in combination with the spherical surface 29, it functions as the main and additional compensators 5 (FIG. 1) and 16. These are dispensed with, and the lens system 6" (FIG. 4) is arranged between the light splitters 4 and 17 (FIGS. 1 and 2). The optical matching of the back focus $F_1$ of the lens 3 with the center of curvature of the surface A and of the back focus $F_2$ of the lens 18 with the center of curvature of the surface B is ensured by the configuration of the surfaces 29 and 28.

The interferometer according to the invention functions in the following manner.

The shape of the convex spherical surfaces of optical components may be checked in two different ranges of ratios of D/R.

For making the check in one range, the plane mirror 2 (FIG. 1) is set to the position I. The beams leaving the monochromatic light source 1 go to the plane mirror 2 and are directed thereby to the focusing lens 3. The path of the beams is shown by arrows in FIG. 1. After passing consecutively through the light splitter 4, compensator 5 and lenses 7, 8, 9, 10, the light beams are incident at right angles upon the reference surface A to be partly reflected therefrom and partly to pass therethrough to be incident upon the surface 15 being checked. The light beams reflected from the surfaces A and 15 interfere to give an interference pattern which is recorded by the system 11. Further handling of the interference pattern to reveal errors of the shape of the surface 15 being checked is effected by conventional methods and is not disclosed herein.

For checking in a different range, the plane mirror 2 (FIG. 2) is brought to the position II.

The beams from the monochromatic light source are reflected from the mirror 20, to the additional focusing lens 18 and after passing consecutively through the additional light splitter 17, additional compensator 16 and lenses 10–7, are incident at right angles upon the reference surface B. The light beams reflected from the surface B and from the surface 22 of the component 21 being checked interfere and form an interference pattern which is recorded by the additional recording system 19.

The reference concave surfaces A and B which belong of the lenses 10 and 7 (FIGS. 1 and 2), respectively, have about the same light diameters but substantially different radii of curvature which are in a ratio of about 1:2.5. This permits the surfaces A and B to be used for checking convex spherical surfaces with different ratios of D/R.

The lens system 6 (FIGS. 1 and 2) is suitable for checking convex spherical surfaces in two ranges of ranges of ratios of D/R within the range from 0.2 to 0.6.

For checking convex spherical surfaces with a greater ratio of D/R of the order of 0.7 and higher, it is preferred to use the lens system 6″ shown in FIG. 4.

For checking convex spherical surfaces with ratios of D/R of the order of 0.05 and below, it is preferred to use the lens system 6′ shown in FIG. 3.

Operation of the interferometer with the lens system 6′ (FIG. 3) or with the lens system 6″ (FIG. 4) is similar to the operation of the interferometer shown in FIGS. 1 through 4.

The lens systems 6,6′ and 6″ shown in FIGS. 1 through 4 comprise independent optical units with diameters which do not practically exceed the diameters of the surfaces being checked, the total thickness of the lenses and air gaps between them being much smaller than the diameter of the lens system. The remaining assemblies of the interferometer are much more compact than the lens system so that the interferometer may be rapidly assembled on an optical bench.

The embodiment of the interferometer shown in FIGS. 1 and 2 makes it possible to check convex spherical surfaces with a diameter up to 600 mm in two ranges of ratios D/R at about 0.6 and 0.24. The optical system of such interferometer provides for forming a spherical wavefront directed to the reference surfaces A and B, the deviation of the wavefront from the sphere being equal at the maximum to $\lambda$—the wavelength of the light source 1 at the worst. Manufacture of precision reference concave spherical surfaces A, B of the lens system is not associated with any difficulties so that the accuracy of checking is better than $\lambda/1$ and better than $\lambda/20$ taking into account inherent error of the reference spherical surfaces. The interferometer makes it possible to check most frequently employed convex spherical surfaces of wide-aperture, long-focus photographic objectives.

INDUSTRIAL APPLICABILITY

The interferometer according to the invention is designed for checking the shape of convex spherical surfaces of optical components of large diameters (about 600 mm) such as lenses of wide-aperture, long-focus photographic objectives.

I claim:

1. An interferometer for checking the shape of convex surfaces of optical components, comprising: a monochromatic light source and a first sequence of devices defining a first optical path arranged therebehind in the path of light beams from said light source, including a first focusing lens, a first light splitter for angularly shifting part of the light from said first focusing lens and for permitting transmission therethrough of reflections of said light from a reference surface, a first compensator, a lens system having a first reference concave spherical surface with a center of curvature optically matched with the back focus of the focusing lens by means of the compensator, and first recording means for recording an interference pattern obtained upon reflection of light beams from the first reference surface through said lens system; a second sequence of devices provided on the other side of said lens system and in the path of light beams from said light source to define a second optical path, including a second compensator, a second light splitter for angularly shifting part of the light from said second focusing lens and for permitting transmission therethrough of reflections of said light from another surface, a second focusing lens, a second reference concave spherical surface, and means for selectively directing light beams from the monochromatic light source to the first focusing lens and to the second focusing lens, said second lens having its back focus optically matched by means of the second compensator with the center of curvature of the second reference concave spherical surface, said first reference concave spherical surface having a radius of curvature different from the radius of curvature of said second reference surface, and second recording means for recording an interference pattern obtained upon reflection of light beams from the second reference surface.

2. An interferometer according to claim 1, wherein the lens system includes two meniscus lenses and two plano-convex lenses arranged therebetween having their plane surfaces facing toward the convex surfaces of the meniscus lenses.

3. An interferometer according to claim 1, wherein the lens system includes two positive meniscus lenses and a biconvex lens arranged therebetween.

4. An interferometer according to claim 1, wherein the lens system includes two positive meniscus lenses, the convex surface of at least one of said lenses being aspherical and functioning as the first and second compensators.

* * * * *